Oct. 18, 1932.  V. W. WILLS  1,883,178
PIPE SUPPORTER
Filed March 29, 1930
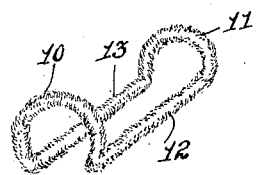
Fig. 1.
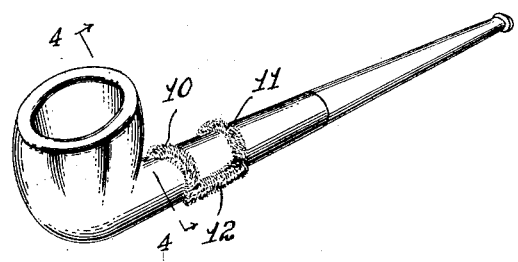
Fig. 2.
Fig. 4.
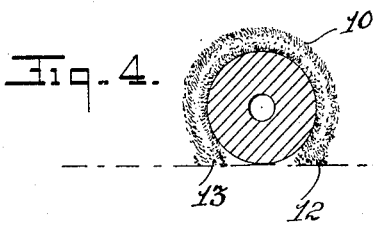
Fig. 5.
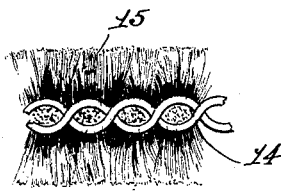
Fig. 3.
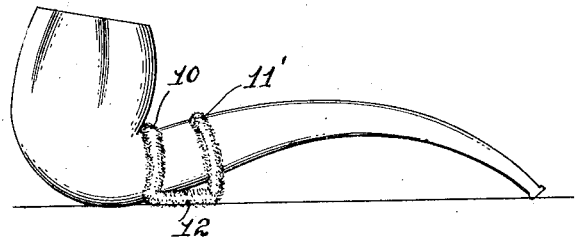
WITNESS:
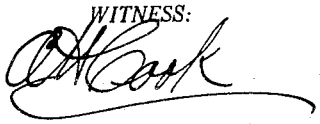
INVENTOR
Victor W. Wills.
BY
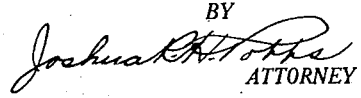
ATTORNEY Patented Oct. 18, 1932

1,883,178

UNITED STATES PATENT OFFICE

VICTOR W. WILLS, OF PHILADELPHIA, PENNSYLVANIA

PIPE SUPPORTER

Application filed March 29, 1930. Serial No. 439,918.

This invention relates to pipe supporters and has for an object to provide a device to be attached to the stem of a pipe, making contact with the underlying body in line with the bottom part of the pipe and supporting it in upright position.

A further object of the invention is to provide a device closely embracing the stem of a pipe and offering the minimum obstruction to inserting and withdrawing the pipe from the pocket.

A further object of the invention is to provide a pipe supporter adapted to maintain the pipe with the bowl in upright position and affording ornamental additions to the pipe.

With these and other objects in view, the invention comprises a loop-like structure embracing the stem of a pipe with side members extending along opposite sides of the stem in alinement with the bottom of the stem and presenting supporting parts upon the lateral sides of the stem.

In the drawing:

Figure 1 is a perspective view of one embodiment of the invention,

Figure 2 is a perspective view of the invention applied to one type of pipe,

Figure 3 is a view in side elevation of the invention applied to a different type of pipe, Figure 4 is a transverse sectional view through a pipe stem showing the invention thereon taken on line 4—4 of Figure 2, and Figure 5 is a sectional fragmentary view showing one manner of constructing a material of which the pipe supporter is made.

Like characters of reference indicate corresponding parts throughout the several views.

It is well known of course, that smoking pipes as ordinarily constructed at the present time, do not stand up and when placed upon a table or the like, are practically sure to tilt and spill the contents. The present invention is directed to means for supporting a pipe in upright position without offering serious obstruction to the insertion and withdrawal of the pipe into and from the pocket, and at the same time, provide an attachment for the pipe which is unobjectionable or ornamental. With this in view, the device comprises spaced loops 10 and 11, somewhat horeshoe shaped, which are properly contoured to clasp about the stem of a pipe. The ends of the loops are connected by longitudinal bars 12 and 13 which extend along the sides of the stem and in plane with the bottom surface of the stem as shown more particularly at Figure 4. For pipes having curved stems, this will be modified somewhat as the bars represented by 12 at Figure 3, will not extend exactly in parallelism with the underside of the stem, but the plane of the bars will be in plane with the bottom of the bowl of the pipe as shown at that figure and accomplish the same purposes.

The device may be made of any material found convenient or desirable. At the present time, it has been thought that a device of the class made from wire twisted as at 14 in Figure 5, with fibrous or fabric material 15, twisted in forming a brush or cushion like surface, will be the type of material employed and for that purpose is particularly illustrated. This will produce a pipe supporter having a soft yielding exterior which will not damage the pocket of the user and will offer practically no obstruction to the insertion of the pipe into the pocket or withdrawal from the pocket or will not mar furniture upon which it is placed. While this material and manner of making is deemed at the present time a desirable type, it is to be understood that it is only suggestive and that the material may be made up in any manner or any other type of material may be employed as seems expedient.

Whatever form the material may take, it will be of sufficient resiliency to maintain itself with reasonable security upon the stem of the pipe, as shown at either Figures 2 or 3, and will be made in such varieties of shapes, sizes and forms as will enable one to select a supporter to fit any type of pipe, and when applied the bars 12 or 13 are substantially in line with the bottom plane of the pipe as it would stand upon a table with the bars upon opposite sides of the stem so as to offer a plurality of points to support and therefore maintain the pipe in upright position.

Of course, the pipe supporter may be modified in various ways without departing from the invention herein set forth and hereinafter claimed.

The invention is hereby claimed as follows:—

1. A pipe supporter comprising resilient loops each formed substantially as the major arc of a circle, said loops being spaced apart in substantially parallel planes and bars connecting similar ends of the loops.

2. The combination with a pipe embodying a stem of resilient loops partially embracing and clasping the stem and bars connecting the ends of the loops and lying in substantially the same plane with the adjacent surface of the pipe stem.

3. The combination with a pipe embodying a stem, members spaced upon opposite sides of the stem and lying substantially in planar unity with the interposed stem surface and forming therewith triple contacts with an underlying body, and means embracing the stem and connecting the members.

4. A pipe supporter comprising spaced bars lying substantially in the same plane, and spaced loops connecting corresponding ends of the bars, said loops being of such individual dimensions as to fit and clasp different parts of a pipe stem.

5. A pipe supporter comprising spaced bars lying substantially in the same plane, and spaced resilient loops connecting corresponding ends of the bars, said loops being of such individual dimensions as to fit and clasp different parts of a pipe stem.

6. A pipe supporter comprising spaced bars lying substantially in the same plane, and spaced loops connecting corresponding ends of the bars and lying in substantially parallel planes, said loops being of such individual dimensions as to fit and clasp different parts of a pipe stem.

In testimony whereof I have signed my name to this specification.

VICTOR W. WILLS.